United States Patent Office 2,813,102
Patented Nov. 12, 1957

2,813,102

2-(DI-LOWER ALKYLAMINOETHYLMERCAPTO)-IMIDAZOLINES AND THEIR ACID ADDITION SALTS AND PREPARATION THEREOF

Stanley O. Winthrop, Montreal, Quebec, Canada, assignor to American Home Products Corporation, New York, N. Y., a corporation of Delaware No Drawing. Application April 10, 1956,
Serial No. 577,206

15 Claims. (Cl. 260—309.6)

This invention relates to new compounds which have therapeutic activity, being especially suitable for use as analgesics. More particularly, my invention relates to certain novel imidazoline derivatives and to their acid addition salts, which compounds are of low toxicity and possess analgesic activity.

The new compounds with which this invention is especially concerned are the 2-(dialkylaminoethylmercapto)-imidazolines of the generic type formula:

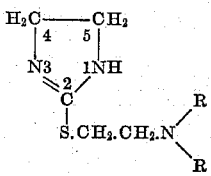

where R represents lower alkyl, and their acid addition salts.

These new compounds may be readily prepared by reacting ethylenethiourea with a dialkylaminoethyl halide, preferably employed in the form of an acid addition salt thereof. Thus a dialkylaminoethylchloride hydrochloride may be reacted with ethylenethiourea. When the equimolar mixture of the reactants is brought together in an inert solvent, such as isopropanol, at an elevated temperature above room temperature, the desired imidazoline derivative in the form of a salt thereof such as the dihydrochloride salt results. It may then be recovered from the reaction mixture and purified by recrystallization from a suitable solvent. In a similar manner other dihydrogen halide salts, and other acid salts such as dihydrogen sulfate salts, may be readily prepared.

In preparing the free base, I have found it desirable first to prepare an acid salt, such as the dihydrogen halide salt, and then remove the hydrogen halide of addition. This may be readily accomplished in various ways, and I have found sodium methoxide an effective agent for converting the 2-(dialkylaminoethylmercapto)-imidazoline dihydrogen halide salt to the free 2-(dialkylaminoethylmercapto)-imidazoline base.

The following examples are illustrative of my invention.

EXAMPLE 1

*2-(dimethylaminoethylmercapto)-imidazoline dihydrochloride*

10 grams (0.093 mole) of ethylenethiourea and 13.4 grams (0.093 mole) of dimethylaminoethylchloride hydrochloride were dissolved in 175 milliliters of isopropanol and the resulting solution was refluxed for two and one-half days. When the solution was then allowed to cool to room temperature some solid product precipitated out.

The isopropanol solvent was then removed by evaporation in vacuo, i. e., at a reduced pressure less than atmospheric, and the solid residue resulting was combined with the solid product that precipitated originally from the solution upon cooling. The product was 2-(dimethylaminoethylmercapto)-imidazoline dihydrochloride, a representative sample as crystallized from isopropanol melting at 179–183° C. After two subsequent recrystallizations from isopropanol a representative sample of the purified product, of empiric formula $C_7H_{17}N_3SCl_2$, had a melting point of 183.5–184.5° C.

Calc.—C, 34.15; H, 6.96; N, 1706; S, 13.02; Cl, 28.80. Found: C, 34.22; H, 7.02; N, 16.92, 17.00; S, 13.02, 13.61; Cl, 28.89, 28.65.

EXAMPLE 2

*2-(diisopropylaminoethylmercapto)-imidazoline dihydrochloride*

7.8 grams (0.075 mole) of ethylenethiourea and 15.1 grams (0.075 mole) of diisopropylaminoethylchloride hydrochloride were dissolved in 100 milliliters of isopropanol and the resulting solution was refluxed for two days. When the solution was then allowed to cool to room temperature there was obtained 20 grams of a solid product, a representative sample of which melted at 217–219° C. (with dec.). The solid product was recrystallized from ethanol-ether mixture to yield 12.5 grams of a crystalline product melting at 218–219° C. (with dec.). This product was 2-(diisopropylaminoethylmercapto)-imidazoline dihydrochloride of empiric formula $C_{11}H_{25}N_3SCl_2$.

Calc.—N, 13.91; S, 10.60; Cl, 23.47. Found: N, 14.29, 13.94; S, 10.67, 10.83; Cl, 23.49, 23.35.

EXAMPLE 3

*2-(diethylaminoethylmercapto)-imidazoline dihydrochloride*

5.1 grams (0.05 mole) of ethylenethiourea and 8.6 grams (0.05 mole) of diethylaminoethylchloride hydrochloride were dissolved in 50 milliliters of isopropanol and refluxed for two days. On cooling, there was obtained 12.6 grams of a solid product, a typical sample of which melted at 188–190° C. (with dec.). It was recrystallized from ethanol to yield 8.7 grams of 2-(diethylaminoethylmercapto)-imidazoline dihydrochloride melting at 193–194° C. (with dec.). The product had the empiric formula $C_9H_{21}N_3SCl_2$.

Calc.—N, 15.32; S, 11.69; Cl, 25.86. Found: N, 15.05, 15.24; S, 11.96, 12.00; Cl, 25.82, 25.78.

EXAMPLE 4

*2-(diisopropylaminoethylmercapto)-imidazoline*

12.5 grams (0.0415 mole) of 2-(diisopropylaminoethylmercapto)-imidazoline dihydrochloride as prepared in Example 2, and 4.55 grams (0.083 mole) of sodium methoxide were dissolved in 200 milliliters of methanol. After the heat of neutralization had been dissipated, the solution was filtered to remove the precipitated sodium chloride. When the methanol was evaporated, at a reduced pressure less than atmospheric, 7.0 grams of the free base 2-(diisopropylaminoethylmercapto)-imidazoline in the form of a thick, light brown oil was obtained. When it was attempted to distill this oil, the free base appeared to decompose and a strong mercaptan-like odor was observed. When the base was allowed to stand at room temperature for 16 hours, it was noted that the color deepened and some decomposition was evident by the presence of the mercaptan-like odor.

The free base, 2-(diisopropylaminoethylmercapto)-imidazoline, was characterized by conversion to its acid salts. A small quantity was treated with ethereal hydrogen chloride, and the solid product recrystallized once from isopropanol to yield a dihydrochloride salt. This product, melting at about 219° C. (with dec.) gave an infra-red spectrum identical with that of a known sample of 2-(diisopropylaminoethylmercapto)-imidazoline dihydrochloride.

EXAMPLE 5

2-(diisopropylaminoethylmercapto)-imidazoline dihydrobromide 1.0 gram of 2-(diisopropylaminoethylmercapto)-imidazoline was dissolved in 10 milliliters of ether and an excess amount of hydrobromic acid dissolved in isopropanol was added. The dihydrobromide salt precipitated as an oil which solidified on trituration with ether-isopropanol to yield 1.3 grams of product, a typical sample of which melted at 202–205° C. Recrystallization from ether-ethanol gave 1.2 grams of pure product melting at 206–207° C., of empiric formula $C_{11}H_{25}N_3SBr_2$.

Calc.—N, 10.74; S, 8.19; Br, 40.85. Found: N, 10.72, 10.54; S, 8.37, 8.17; Br, 40.92, 41.32.

EXAMPLE 6

2-(diisopropylaminoethylmercapto)-imidazoline dihydrogensulphate 1.0 gram of 2-(diisopropylaminoethylmercapto)-imidazoline was dissolved in 10 milliliters of ether and an excess amount of sulfuric acid dissolved in a small amount of isopropanol was added thereto. The sulfate precipitated as an oil which solidified on trituration with ether-isopropanol to yield 0.95 gram of product melting at 130–140° C. (with dec.). Two recrystallizations from ether-isopropanol gave 0.30 gram of the substantially pure product 2-(diisopropylaminoethylmercapto)-imidazoline dihydrosulfate, a typical sample of which melted at 145–146° C. Analysis confirmed the empiric formula $C_{11}H_{27}N_3S_3O_8$.

I claim:

1. A compound selected from the group which consists of imidazoline derivatives of the generic formula:

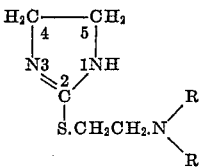

where R is lower alkyl, and their non-toxic acid addition salts.

2. The 2-(dialkylaminoethylmercapto)-imidazolines of the formula:

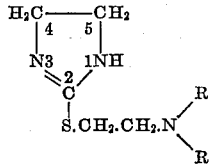

where R is lower alkyl.

3. 2-(dimethylaminoethylmercapto)-imidazoline dihydrochloride.

4. 2-(diethylaminoethylmercapto)-imidazoline dihydrochloride.

5. 2-(diisopropylaminoethylmercapto)-imidazoline dihydrochloride.

6. 2-(diisopropylaminoethylmercapto)-imidazoline dihydrogensulphate.

7. 2-(diisopropylaminoethylmercapto)-imidazoline.

8. The process of preparing 2-(di-loweralkyl aminoethylmercapto)-imidazoline salts which comprises bringing together ethylenethiourea and an acid addition salt of a di-lower alkyl aminoethyl halide in an inert solvent at an elevated temperature.

9. The process of preparing 2-(di-lower alkyl aminoethylmercapto)-imidazoline salts which comprises reacting ethylenethiourea and a hydrohalide salt of di-lower alkyl aminoethyl chloride, said reactants being brought together at an elevated temperature in an inert solvent therefor.

10. The process of preparing 2-(dimethylaminoethylmercapto)-imidazoline dihydrochloride which comprises bringing ethylenethiourea and dimethylaminoethylchloride hydrochloride together in an inert solvent at an elevated temperature.

11. The process of preparing 2-(dimethylaminoethylmercapto)-imidazoline dihydrochloride which comprises reacting ethylenethiourea and dimethylaminoethylchloride hydrochloride by bringing said reactants together in substantially equimolar proportions at an elevated temperature while dissolved in an inert solvent, and recovering the product from the reaction mixture.

12. The process of preparing 2-(diethylaminoethylmercapto)-imidazoline dihydrochloride which comprises reacting ethylenethiourea and diethylaminoethylchloride hydrochloride by bringing said reactants together in substantially equimolar proportions at an elevated temperature while dissolved in an inert solvent, and recovering the product from the reaction mixture.

13. The process of preparing 2-(diisopropylaminoethylmercapto)-imidazoline dihydrochloride which comprises reacting ethylenethiourea and diisopropylaminoethylchloride hydrochloride by bringing said reactants together in substantially equimolar proportions at an elevated temperature while dissolved in an inert solvent, and recovering the product from the reaction mixture.

14. The process of preparing a 2-(dialkylaminoethylmercapto)-imidazoline which comprises treating a 2-(dialkylaminoethylmercapto)-imidazoline dihydrohalide with an agent for removing the hydrohalic acid of addition therefrom.

15. The process of preparing a 2-(dialkylaminoethylmercapto)-imidazoline dihydrogensulphate which comprises treating a 2-(dialkylaminoethylmercapto)-imidazoline with an excess of sulfuric acid in an inert solvent.

No references cited.